April 13, 1954 R. H. KIRKNESS 2,675,423

DIRECT-CURRENT RESTORER SYSTEM FOR COMPENSATING FOR THE FINITE IMPEDANCE OF RESTORING TUBES

Filed July 18, 1950 2 Sheets-Sheet 1

INVENTOR.
ROBERT H. KIRKNESS

BY Laurence B. Dodds

ATTORNEY

April 13, 1954 R. H. KIRKNESS 2,675,423

DIRECT-CURRENT RESTORER SYSTEM FOR COMPENSATING FOR THE FINITE IMPEDANCE OF RESTORING TUBES

Filed July 18, 1950 2 Sheets-Sheet 2

INVENTOR.
ROBERT H. KIRKNESS

BY Laurence B. Dodds

ATTORNEY

Patented Apr. 13, 1954 2,675,423

UNITED STATES PATENT OFFICE 2,675,423

DIRECT-CURRENT RESTORER SYSTEM FOR COMPENSATING FOR THE FINITE IMPEDANCE OF RESTORING TUBES

Robert Hylton Kirkness, Wembley, England, assignor to Hazeltine Research, Inc., Chicago, Ill., a corporation of Illinois Application July 18, 1950, Serial No. 174,509

Claims priority, application Great Britain July 22, 1949

8 Claims. (Cl. 178—7.3)

GENERAL

Figures 1, 3:
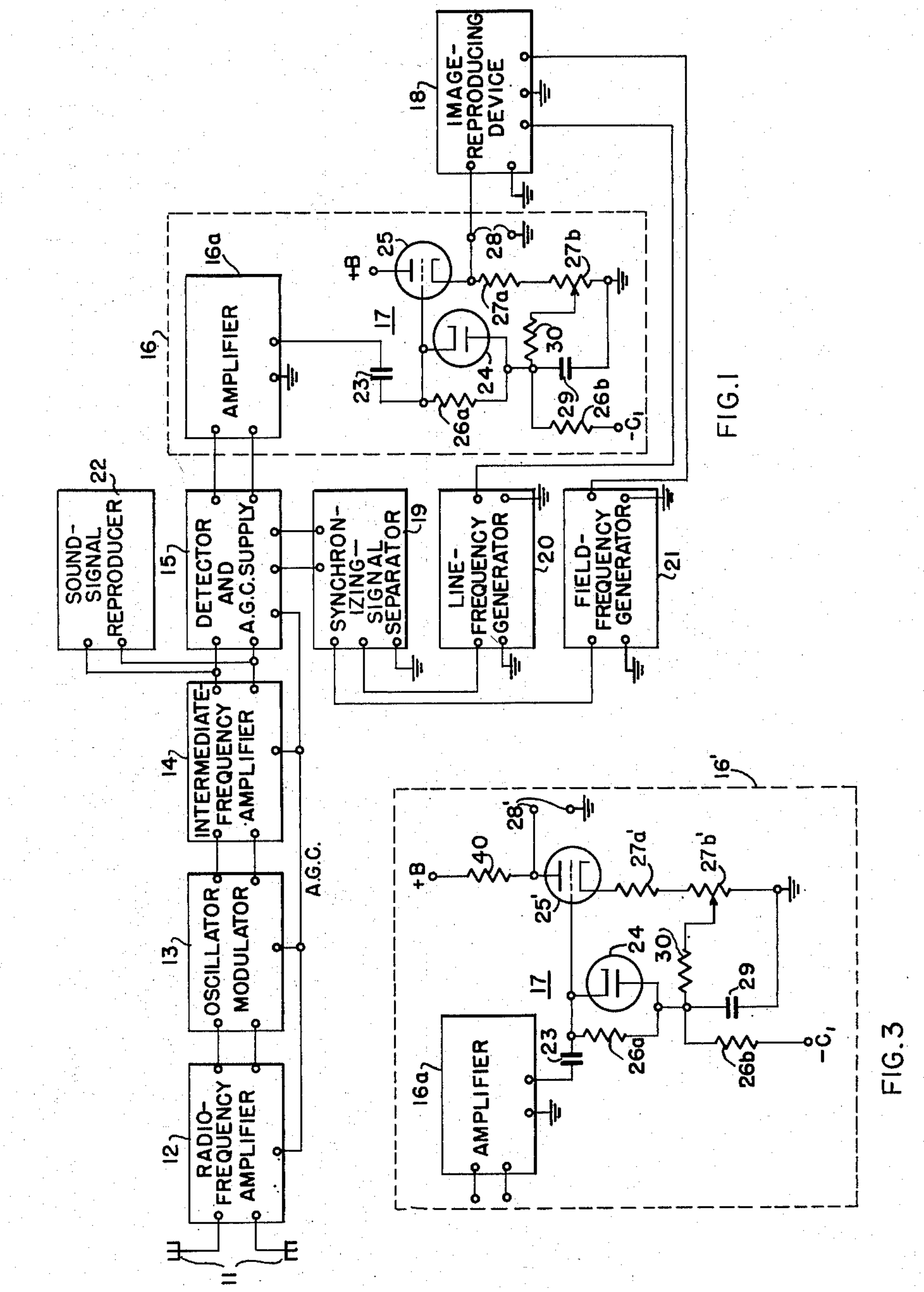

This invention relates to automatic control systems and, more particularly, to systems which automatically control an operating characteristic of a signal-translating channel to compensate for any undesired variations in the operating characteristic caused by variations in characteristics of the signals applied to the system. Such a control system has particular utility in a television receiver as a direct-current restorer system for compensating for variations in the level of the restored direct-current component of the television signal caused by the finite impedance of the restoring tube and for that reason will be described in that environment.

Conventionally, there is applied to and translated through a video-frequency amplifier of a television receiver a signal having video-frequency components and synchronizing-signal components. It is customary to use alternating-current coupling between the stages of such an amplifier. As a result the potential on the control electrode of the succeeding tube, corresponding to a reference level for the signal, normally fluctuates as a result of any variations in the video component of the applied signal. In order to effect restoration of the direct-current component of the video-frequency signal in the input circuit of the succeeding amplifier stage, a direct-current restoration circuit or clamping device is provided. Some circuits of this type are arranged to restore such component of an applied signal in relation to the peak amplitudes of the line-synchronizing pulses by, in effect, "clamping" these peaks to a reference level. Such reference level then provides the direct-current component and is related to the average background illumination of the image being reproduced.

The clamping or rectifier circuit usually comprises essentially a rectifier device coupled across a grid-leak resistor in the input circuit of the amplifier tube in the stage utilizing such restoration in such a sense that the rectifier only conducts when line-synchronizing or field-synchronizing pulses are applied thereto. As variations in the amount of current flowing through the rectifier occur with changes in the intensity of the applied video-frequency signals including the synchronizing-signal components, the reference potential applied to the associated amplifier tube also changes in such a manner as to produce an effect which is continuously proportional to the peak intensity and duration of the applied signal. Such potential may be representative of the average background illumination of the image being reproduced and any spurious variations therein may cause a change in the value of such background illumination. Due to the inherent finite resistance of the rectifier device used for direct-current restoration purposes and other finite resistances such as that of the signal source, as the level of the applied signal varies there is also a change in the voltage developed across the rectifier as it conducts and this change or spurious variation reflects itself as an undesirable change in the reference potential and thus in the value of the background illumination.

In addition to the above-mentioned undesirable characteristic of conventional direct-current restoration circuits, such circuits also react to changes in the duration of the applied synchronizing pulses undesirably to vary the level of the restored direct-current component. Since the value of the unidirectional signal representative of the background illumination is dependent on the average current flowing through the rectifier circuit, the level at which short-duration or line-frequency pulses are stabilized differs from that at which long-duration or field-frequency pulses are stabilized. The field-frequency pulses being of longer duration cause current to flow through the rectifier for a longer period of time causing the reference potential to rise and, therefore, for the level of the restored direct-current component to rise during this period. Such a rise produces a change in the value of the average background illumination and is, therefore, undesirable.

It is an object of the present invention to provide a new and improved automatic control system which avoids one or more of the above-mentioned limitations of prior systems.

It is another object of the present invention to provide for use in a television receiver a new and improved automatic control system which includes a direct-current reinsertion network and which avoids one or more of the above-mentioned limitations of prior such systems.

It is still another object of the invention to provide for use in a television receiver a new and improved automatic control system which includes a direct-current reinsertion network in which the direct-current reference level provided by the network is precisely stabilized.

It is an additional object of the invention to provide for use in a television receiver a new and improved automatic control system which includes a direct-current reinsertion network which is substantially unresponsive to variations in signal amplitude or in the pulse duration of the recurrent synchronizing pulses.

In accordance with the present invention there is provided a system for automatically controlling an operating characteristic of a signal-translating channel for translating a television signal having video-frequency and synchronizing-signal components of a predetermined polarity and a period and having a pretermined shade level which comprises a video-frequency amplifier coupled to the aforesaid channel for translating at least the above-mentioned video-frequency components and including a cathode-load output circuit for the translated components. The control system also comprises a direct-current restorer system including a rectifier device having a finite conduction resistance and an impedance circuit coupled to the aforesaid channel and to the amplifier, the impedance circuit having a time constant substantially longer than the aforesaid period of the synchronizing-signal components and the device being so poled with respect to the aforementioned predetermined polarity that the restorer system is effective to derive from the television signal a control potential for the amplifier which is representative of the predetermined shade level undesirably modified by the effect of the finite resistance of the device. The system also comprises an impedance network coupled in circuit with the restorer system and including at least a portion of the cathode load circuit and having a time constant substantially shorter than the aforesaid time constant of said impedance circuit for developing from the television signal across the aforementioned portion of the cathode circuit a voltage substantially equal to the aforesaid modification of the developed potential caused by the finite resistance of the device and means for combining the aforesaid voltage and potential to produce a resultant potential in which the influence of the finite resistance of the rectifier device on the operating characteristic is reduced.

For a better understanding of the present invention, together with other and further objects thereof, reference is had to the following description taken in connection with the accompanying drawings, and its scope will be pointed out in the appended claims.

Figure 4:
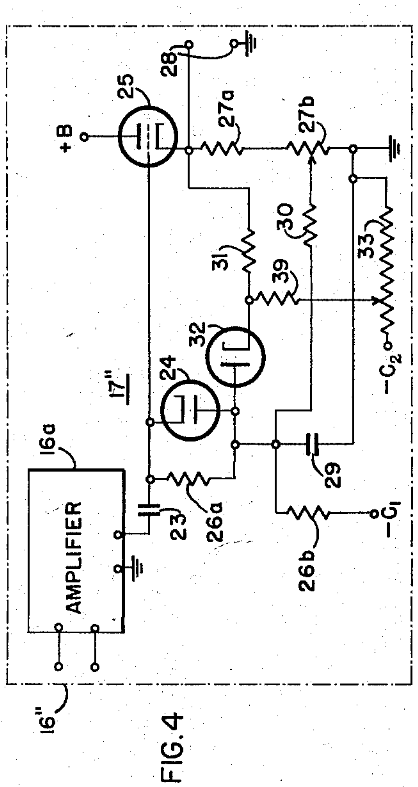
Figure 2:
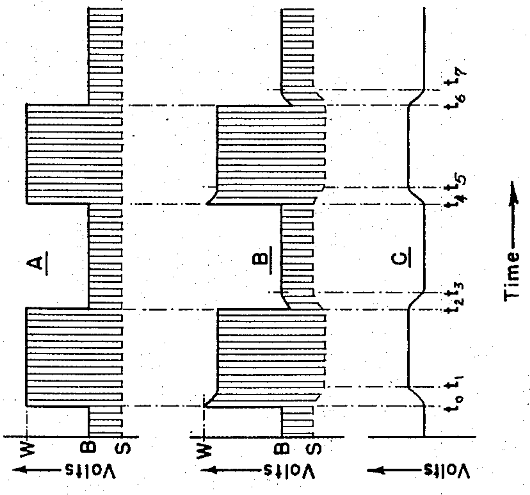

In the accompanying drawings, Fig. 1 is a circuit diagram, partly schematic, of a television receiver including an automatic control system embodying a particular form of the present invention; Figs. 2*a*–2*c*, inclusive, are graphs useful in explaining the operation of the automatic control system utilized in the Fig. 1 receiver; Figs. 3 and 4 represent modified forms of the automatic control system of Fig. 1; and Figs. 5*a*–5*c*, inclusive, are graphs useful in explaining the operation of the system of Fig. 4.

*General description of receiver of Fig. 1*

Referring now more particularly to Fig. 1 of the drawings, there is represented therein a television receiver including a signal-translating channel comprising an automatic control system embodying a particular form of the present invention. The television receiver there represented is of the superheterodyne type and has an antenna system 11, 11 coupled to a radio-frequency amplifier 12 of one or more stages. Coupled in cascade with the output circuit of the amplifier 12, in the order named, are an oscillator-modulator 13, an intermediate-frequency amplifier 14 of one or more stages, a detector and automatic-gain-control (AGC) supply 15, a signal-translating channel 16 being more particularly a video-frequency amplifier of one or more alternating-current coupled stages, and an image-reproducing device 18. The channel 16 includes an automatic control system embodying the present invention in one form to be more particularly described hereinafter. There is also coupled to the detector 15 a synchronizing-signal separator 19 having output circuits connected with a line-frequency generator 20 and a field-frequency generator 21. The output circuits of these generators, in turn, are connected with beam-deflecting windings in the image-reproducing device 18. The output circuit of the automatic-gain-control supply of unit 15 is connected to the input circuits of one or more of the tubes of radio-frequency amplifier 12, oscillator-modulator 13 and intermediate-frequency amplifier 14 in well-known manner.

A sound-signal reproducer 22 is also connected to the output circuit of the amplifier 14. The reproducer 22 may have stages of intermediate-frequency amplification, a sound-signal detector, stages of audio-frequency amplification and a sound-reproducing device.

It will be understood that the various units thus far described, with the exception of portions of the signal-translating channel 16, may have any conventional construction and design. The details of such components are well known in the art rendering a further description thereof unnecessary.

*General explanation of the operation of receiver of Fig. 1*

Considering briefly the operation of the receiver as a whole and assuming for the moment that the unit 16 is a conventional video-frequency amplifier, a desired modulated television wave signal is intercepted by the antenna system 11, 11. The signal is selected and amplified in the radio-frequency amplifier 12, applied to the oscillator-modulator 13 wherein it is converted into an intermediate-frequency signal, the latter being translated through the amplifier 14 and having the modulation-signal components thereof derived in the detector 15. The derived components, which comprise video-frequency as well as recurring or synchronizing-signal components, are amplified and translated through the video-frequency amplifier 16, wherein the direct-current component of the video-frequency signal is restored, and applied to the brilliancy-control electrode of the image-reproducing device 18 to modulate the intensity of the electron beam therein in accordance with the variations in intensity of the video-frequency components. The synchronizing-signal components of the received signals are separated from the video-frequency components in the separator 19 and are used to synchronize the line-frequency and field-frequency generators 20 and 21, respectively. These generators then apply signals of saw-tooth wave form properly synchronized with reference to the received television signal to the beam-deflecting windings of the image-reproducing device 18 thereby to deflect the reproducing beam therein in two directions normal to each other to reproduce the received television image.

The automatic-gain-control or (AGC) signal derived in the unit 15 is effective to control the amplification of one or more of the units 12, 13 and 14 to maintain the signal input to the detector 15 and to the reproducer 22 within a relatively narrow range for a wide range of the received signal intensity.

The sound-signal modulated wave signal is also intercepted by the antenna system 11, 11 and after selective amplification in the amplifier 12 is converted to a sound-modulated intermediate-frequency signal in the oscillator-modulator 13, the latter being translated through the amplifier 14 and applied to the reproducer 22. In the reproducer 22 this signal is amplified and detected to derive the sound-signal modulation components which may then be further amplified and utilized therein.

*Description of automatic control system of Fig. 1*

Referring now more particularly to the automatic control system of Fig. 1 which comprises a black-level stabilization network 17 coupled in the input circuit of the second of two resistor-condenser coupled amplifier stages, one including an amplifier 16*a* and the other including the tube 25, respectively. The amplifier 16*a* represented in block form may be of conventional form for the amplification of video-frequency signals, particularly it may comprise a pentode-type amplifier. The amplifier stage is a video-frequency amplifier including the vacuum tube 25 and has an input circuit coupled to the output circuit of the amplifier 16*a* through a coupling condenser 23. Biasing means coupled to the control electrode of the tube 25 comprises the condenser 23 and a grid-leak resistor 26*a*. The end of the resistor 26*a* remote from the condenser 23 is coupled to a source of bias potential $-C_1$ through a resistor 26*b*. The anode of the tube 25 is coupled to a source of suitable +B potential and the cathode is coupled to ground through series-connected cathode load resistors 27*a* and 27*b*, the resistor 27*b* being a voltage divider having an adjustable tap point.

The signal-translating channel including the amplifier 16*a* and the tube 25 is utilized for translating a television signal including video-frequency components and synchronizing-signal components having pulses of positive polarity and of distinctive durations and different periods and may include the system 17 for automatically controlling an operating characteristic, specifically for controlling the black level or stabilization of a signal in a signal-translating channel in accordance with the present invention. The system 17 comprises a direct-current restorer system including a rectifier device having a finite conduction resistance and comprising the diode 24 and including an impedance circuit coupled to the aforesaid channel and to the amplifier, specifically, the series circuit of the coupling condenser 23, and a pair of resistors 26*a* and 26*b* coupled between the amplifier 16*a* and a source of potential $-C_1$. The resistor 26*a* is connected between the cathode and anode of the diode 24, the cathode also being connected to the control electrode of the tube 25. The impedance circuit, specifically the circuits of the condenser 23 and the resistors 26*a* and 26*b*, has a time constant substantially longer than the period of the line-frequency synchronizing-signal components and the device including the diode 24 is so poled with respect to the predetermined polarity of the synchronizing-signal peaks that the restorer system is effective to derive from the television signal a control potential for the control electrode of the tube 25 which is representative of the black level undesirably modified by the finite resistance of the diode 24.

The automatic control system 17 also comprises an impedance network coupled in circuit with the rectifier system, in particular in series with at least a component, specifically a rectifier device or tube, of the rectifier system, and which includes at least a portion of the cathode load circuit of the amplifier. The network is so proportioned as to develop from the television signal a second control effect or potential related to voltage variation across the rectifier device.

As will be explained hereinafter, there is developed across the rectifier device 24 when conductive a voltage varying with a characteristic of the television signal and undesirably affecting the operating characteristic or black level of the signal. More particularly, the voltage developed thereacross, and thus across the resistor 26*a*, varies with both the average amplitude of the television signal and with differences in the pulse durations of the synchronizing-signal components. Specifically, the impedance network is a time-constant network comprising a condenser 29, coupled between the anode of the rectifier device 24 and ground, and a resistor 30 effectively coupled in parallel therewith through a portion of the voltage divider 27*b*. The time constant of such network is substantially shorter than the time constant of the aforesaid circuit including the condenser 23 and the resistor 26*a* and is effective to develop from the television signal across the aforementioned portion of the cathode circuit a voltage substantially equal to the aforesaid modification of the developed potential caused by the finite resistance of the device. The impedance network may also comprise the cathode load circuit of the tube 25 including both the resistors 27*a* and 27*b*. The proportioning of the impedance network is effected by proper determination of the values of the condenser 29 and the resistors 30, 27*a* and 27*b* to develop a value of the second control effect across the condenser 29 which is proportional and has an opposing sense to the voltage variation across the diode 24. Preferably, the resistor 27*b* has a value which comprises approximately 10% of the total load of the resistors 27*a* and 27*b*. Also, the time constant of the circuit essentially including the resistor 30 and the condenser 29 is proportioned to be small with relation to that of the grid-biasing network including the condenser 23 and the resistor 26*a*. In addition, the coupling of the resistor 30 to the resistor 27*b* is preferably adjustable to effect the desired potential across the condenser 29, as will be explained more fully hereinafter.

The system 17 also comprises means for combining the aforesaid voltage and potential or the potentials developed across the diode 24 and across the condenser 29 to produce a resultant potential or potential in which the deleterious influence of the finite resistance of the rectifier device across the diode 24, while conducting, on the operating characteristic or black level of the television signal is reduced or preferably canceled. This means comprises the leads connecting the network including the condenser 29 and resistor 30 effectively in series with the resistor 26*a* so that the potentials developed across the resistor 26*a* and across the combination of the condenser 29 and the resistors 30 and 27*b* combine to provide the biasing potential for the control electrode of the tube 25.

There is also included in the video-frequency amplifier 16 output terminals 28, 28 for coupling the signal developed in the cathode load resistance of the tube 25 to the input circuit of the image-reproducing device 18.

*Explanation of the operation of the automatic control system of Fig. 1*

The amplifier 16a and the vacuum tube 25 operate in a conventional manner to amplify and translate the video-frequency signals from the output of the detector 15 to the input circuit of the image-reproducing device 18. The automatic control system 17 operates in a manner to maintain the black level of the television signal being translated through the above-mentioned amplifier stages stable i. e. substantially independent of video-frequency signal variations. This stability is maintained even though the average-amplitude level of the signal being translated through the circuit may vary. The manner in which the system 17 operates to effect such stability and the problem created by the variation in average amplitude of the television signal may best be understood by reference to the curves of Figs. 2*a*–2*c*, inclusive.

Fig. 2*a* represents a television signal having different levels that might be translated through the amplifier 16, specifically representing a signal that might be applied to the control electrode of the tube 25 ignoring for the purpose of this consideration the effect of the condenser 23 in causing the signal to have an alternating-current axis at this point. In Fig. 2*a* and subsequent figures referred to hereinafter, the letters S, B and W respectively represent the synchronizing, black and white levels of the television signal. Also, no reference axes have been shown for the curves of such figures, since such axes are not essential to the explanation of the invention. It is to be understood that all signals passing through alternating-current coupling circuits have an axis positioned at the average level of the signal and that a direct-current reinsertion network develops a direct-current axis for the signal, generally at substantially the position of the synchronizing-pulse peaks. It is to be noted that the synchronizing pulses occur at the same level throughout the extension of the television signal and that the black level of the signal is stable being fixed with respect to the peak amplitude of the synchronizing pulses.

Conventionally, in modern television receivers, the rectifier 24 of the direct-current reinserter system conducts on synchronizing-signal peaks for the purpose of re-establishing in the receiver a black level for the television signal. Due to the finite resistance of a rectifier such as the diode 24 and other finite resistances in the circuit supplying the signal, there is a potential developed across the tube 24 while it is conducting depending upon the magnitude of the current flowing through the tube. Thus, in the presence of a pure black signal, when only a small amount of current flows through the diode 24, a potential drop of one value is established thereacross. In the presence of pure white signals, when more current is flowing therethrough, a different potential is developed thereacross. This variation in potential across the diode 24 causes the synchronizing and black levels of the signal to become unstable as represented by the curve of Fig. 2*b*. Effectively, due to the described variations in the potential across the diode 24, the average background illumination of the image being reproduced by device 18 undesirably varies as the average intensity of the signal being translated through the tube 25 varies. The impedance network including the condenser 29 and the resistors 30 and 27b is proportioned to compensate for this undesired variation in potential drop in the diode 24. The curve of Fig. 2*c* represents the variation in potential across the condenser 29 with variations in the average amplitude of the television signal.

The voltage developed across the condenser 29 is proportional to the current flowing through the tube 25, therefore, to the potential of the signal applied to that tube. More specifically, the voltage across the condenser 29 is related to the potential developed across the resistor 27b. The resistor 30 and the condenser 29 provide a time-constant network for developing, across the condenser 29, the voltage across the lower part of the resistor 27b then connected to the condenser 29 through the resistor 30. The reaction of the network 29, 30 is in the proper sense to compensate for a similar reaction of the finite impedance of the signal source 16a, the condenser 23 and the diode 24 and is represented in the curve of Fig. 2*c* by the rise in potential indicated between the times $t_0$ and $t_1$. Also, as the level of the potential across the condenser 29 builds up to that represented by the portion of the curve of Fig. 2*c* between the times $t_1$ and $t_2$, this potential is in the proper sense and of the proper amount to offset the undesired drop in potential across the diode 24 occurring during conduction therein and, therefore, the undesired variation across the resistor 26a, at the same time, in the manner previously described. It is thus seen that by properly proportioning the values of the resistors 27a, 27b and 30 and the condenser 29, a potential may be developed across the condenser 29 from the television signal which will be related to the undesired voltage variation occurring across the diode 24 during conduction as the average amplitude level of the television signal changes. Therefore, as the reference potential across the resistor 26a tends to drop under such conditions, such tendency is offset by the opposing tendency of the potential across the condenser 29.

From the above discussion it will also be seen that as the level of the television signal changes from white to black at the time $t_2$, the decay in potential across the condenser 29 between the times $t_2$ and $t_3$ is of such a value and in such a sense as to offset the change in potential then occurring across the resistor 26a due to the finite resistance of the diode 24 and of the signal source.

*Description and explanation of operation of the automatic control system in the embodiment of Fig. 3*

Referring now to Fig. 3, there is represented therein a modified form of video-frequency amplifier 16. Since the amplifiers of Fig. 1 and Fig. 3 are similar to each other, similar components are designated by the same reference numerals and analogous components by the same reference numerals primed.

The only difference between the amplifier of Fig. 3 and that of Fig. 1 is the utilization of the vacuum tube 25' therein as an amplifier tube rather than as simply a cathode-follower stage as in Fig. 1. For the purpose of obtaining such amplification, there is included in the anode circuit of the tube 25' an anode load resistor 40 which is coupled to a source of potential +B and comprises the output circuit of the tube 25' being coupled to a terminal 28'.

It will be seen that the operation of the automatic control system in the embodiment of Fig. 3 is similar to that of Fig. 1. The operation of the tube 25′ as an amplifier is conventional and requires no detailed explanation.

*Description of automatic control system embodied in Fig. 4*

Fig. 4 represents a video-frequency amplifier including a modified form of the automatic control system according to the present invention. Since many of the components of the amplifier of Fig. 4 are similar to those in the video-frequency amplifier of Fig. 1, similar components are designated by the same reference numerals and analogous components by the same reference numerals double primed.

In addition to the components described with reference to the system 17 of Fig. 1, there is included in the system 17′′ of Fig. 4 a second network coupled in circuit with the rectifier system and so proportioned as to develop from the television signal an additional control effect or third potential related to the undesired variation in the potential developed across the diode 24 produced by differences in the pulse durations of the synchronizing-signal components applied to the input circuit of the tube 25. More particularly, the second network is proportioned to develop a potential which compensates for the variations in the bias potential related to the black level and which are produced by the differences in pulse durations between line and field pulses. The second network includes a series-connected diode 32 and a resistor 31 coupled between the cathode of the tube 25 and the anode of the diode 24. The second network also includes a voltage divider resistor 33 coupled between a source of potential, indicated as $-C_2$ and ground and adjustably connected through a high value resistor 39 to the cathode of the diode 32.

The values of the resistors 31, 27*a*, 27*b* and 30 in the control system 17′′ of Fig. 4 are proportioned to effect results described more fully hereinafter when explaining the operation of the system. Such proportioning is well known to those skilled in the art and is best described in terms of the effects which are sought. More specifically, the resistor 31 is proportioned to have a value less than that of the resistor 30 while the cathode of the diode 32 is connected to a point on the resistor 33, through the resistor 39, so that a potential is developed at the cathode thereof which causes it to be more negative than the anode thereof when no current is flowing in the tube 25.

*Explanation of the operation of automatic control system of Fig. 4*

Figure 5:
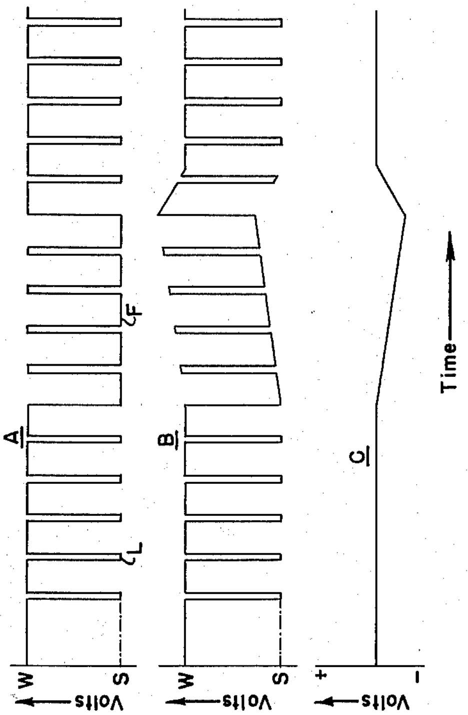

The explanation of the operation of the system 17′′ of Fig. 4 is best understood by reference to Figs. 5*a*–5*c*, inclusive. The curve of Fig. 5*a* represents a continuous white signal in which there occur line-synchronizing pulses of the type designated by the reference letter L and field-synchronizing pulses of greater duration than the line-synchronizing pulses and represented by the letter F. It is desired that the signal represented by Fig. 5*a* be translated through the tube 25 without distortion.

Due to the finite impedance of the tube 24 and of the source of signals and the fact that this tube conducts more average current in the presence of long-duration, field-frequency pulses than it conducts in the presence of short-duration, line-frequency pulses, there is a tendency for the potential representing the black level of the signal and which is developed across the resistor 26*a* to rise effecting a result such as is represented by the curve of Fig. 5*b*. It is there seen that as the bias potential rises, the reference levels of the television signal which are necessary to effect a proper average background illumination in the reproduced image also change, undesirably affecting the reproduction of the image. The second network including the diode 32, the resistor 31 and the resistors 33 and 39 reacts to the synchronizing pulses in such a manner as to offset this tendency of the reference potential to rise in the presence of the longer duration pulses. The voltage developed in this network for combining with the potential developed across the resistor 26*a* as the pulse duration of the synchronizing pulses changes is represented by the curve of Fig. 5*c*. This curve represents the change in potential produced across the condenser 29 as line-frequency pulses and field-frequency pulses are applied to the diode 24.

As has been stated when describing the network including the diode 32, the potential applied to the cathode thereof, when no current flows in the tube 25, is such as to cause the diode 32 to conduct thereby at least partially discharging the condenser 29. Such action occurs when the synchronizing pulses are applied to the control electrode of the tube 25 and the duration of the conduction period of the diode 32 is determined by the duration of these pulses. During such period the resistor 31 becomes part of a time-constant network including the condenser 29 and thus determines the rate at which the condenser 29 discharges. By properly proportioning the resistor 31, a time-constant characteristic such as that represented by the curve of Fig. 5c is developed and the amount of discharge of the condenser 29 during the period of the long-duration field-synchronizing pulses is sufficient to offset the rise in potential across the diode 24 during the same period. In this way, it is possible to maintain the level of the reference potential supplied to the control electrode of the tube 25 constant under conditions of both variations in the average signal intensity of the applied signal and differences in the pulse durations of the synchronizing-signal pulses.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A system for automatically controlling an operating characteristic of a signal-translating channel which translates a television signal having video-frequency and synchronizing-signal components of a predetermined polarity period and having a predetermined shade level comprising: a video-frequency amplifier coupled to said channel for translating at least said video-frequency components and including a cathode-load output circuit for said translated components; a direct-current restorer system including a rectifier device having finite conduction resistance and an impedance circuit coupled to said channel and to said amplifier, said impedance circuit having a time constant substantially longer than said period of said synchronizing-signal components and said device being so poled with respect to said predetermined polarity that said restorer system is effective to derive from said television signal a control potential for said amplifier which is representative of said predetermined shade level undesirably modified by said finite resistance of said device; an impedance network coupled in circuit with said restorer system and including at least a portion of said cathode load circuit and having a time constant substantially shorter than said time constant of said impedance circuit for developing from said signal across said portion of said load circuit a voltage substantially equal to said modification of said potential caused by said finite resistance of said device; and means for combining said voltage and said potential to produce a resultant potential in which the influence of said finite resistance of said device on said operating characteristic is reduced.

2. A system for automatically controlling the black level of a signal in a signal-translating channel which translates a television signal having video-frequency and synchronizing-signal components of a predetermined polarity period and having a black level comprising: a video-frequency amplifier coupled to said channel for translating at least said video-frequency components and including a cathode-load output circuit for said translated components; a direct-current restorer system including a rectifier device having finite conduction resistance and an impedance circuit coupled to said channel and to said amplifier, said impedance circuit having a time constant substantially longer than said period of said synchronizing-signal components and said device being so poled with respect to said predetermined polarity that said restorer system is effective to derive from said television signal a control potential for said amplifier which is representative of said black level undesirably modified by said finite resistance of said device; an impedance network coupled in circuit with said restorer system and including at least a portion of said cathode load circuit and having a time constant substantially shorter than said time constant of said impedance circuit for developing from said signal across said portion of said load circuit a voltage substantially equal to said modification of said potential caused by said finite resistance of said device; and means for combining said voltage and said potential to produce a resultant potential in which the influence of said finite resistance of said device on said black level is reduced.

3. A system for automatically controlling the black level of a signal in a signal-translating channel which translates a television signal having video-frequency and synchronizing-signal components of a predetermined polarity period and having a black level comprising: a video-frequency amplifier coupled to said channel for translating at least said video-frequency components and including a cathode-load output circuit for said translated components; a direct-current restorer system including a rectifier device having finite conduction resistance and an impedance circuit coupled to said channel and to said amplifier, said impedance circuit having a time constant substantially longer than said period of said synchronizing-signal components and said device being so poled with respect to said predetermined polarity that said restorer system is effective to derive from said television signal a control potential for said amplifier which is representative of said black level undesirably modified by said finite resistance of said device; an impedance network coupled in series with at least an element of said restorer system and including at least a portion of said cathode load circuit and having a time constant substantially shorter than said time constant of said impedance circuit for developing from said signal across said portion of said load circuit a voltage substantially equal to said modification of said potential caused by said finite resistance of said device; and means for combining said voltage and said potential to produce a resultant potential in which the influence of said finite resistance of said device on said operating characteristic is reduced.

4. A system for automatically controlling the black level of a signal in a signal-translating channel which translates a television signal including video-frequency components and synchronizing-signal components having pulses of a predetermined polarity and of different durations and different periods and having a black level comprising: a video-frequency amplifier coupled to said channel for translating at least said video-frequency components and including a cathode-load output circuit for said translated components; a direct-current restorer system including a rectifier device having finite conduction resistance and an impedance circuit coupled to said channel and to said amplifier, said impedance circuit having a time constant substantially longer than the shortest one of said periods of said synchronizing-signal components and said device being so poled with respect to said predetermined polarity that said restorer system is effective to derive from said television signal a control potential for said amplifier which is representative of said black level undesirably modified due to said finite resistance of said device by variations in both the average amplitude of said signal and in the pulse durations of said synchronizing components; an impedance network coupled in circuit with said restorer system and including at least a portion of said cathode load circuit and having a time constant substantially shorter than said time constant of said impedance circuit for developing from said signal across said portion of said load circuit a voltage substantially equal to said modification of said potential caused by said finite resistance of said device; and means for combining said voltage and said potential to produce a resultant potential in which the influence of said finite resistance of said device on said operating characteristic is reduced.

5. A system for automatically controlling the black level of a signal in a signal-translating channel including alternating-current coupled repeater stages which translate a television signal including video-frequency components and synchronizing-signal components having pulses of a predetermined polarity and of different durations and different periods and having a black level comprising: a video-frequency amplifier coupled to said channel for translating at least said video-frequency components and including a cathode-load output circuit for said translated components; a direct-current restorer system including a rectifier device having finite conduction resistance and an impedance circuit coupled to said channel and to said amplifier, said impedance circuit having a time constant substantially longer than the shortest one of said periods of said synchronizing-signal components and said device being so poled with respect to said predetermined polarity that said restorer system is effective to derive from said television signal a control potential for said amplifier which is representative of said black level undesirably modified due to said finite resistance of said device by variations in both the average amplitude of said signal and in the pulse durations of said synchronizing components; a first network coupled in circuit with said restorer system and including at least a portion of said cathode load circuit and having a time constant substantially shorter than said time constant of said impedance circuit for developing from said signal across said portion of said cathode circuit a first voltage substantially equal to said modification of said potential caused by variations in the average amplitude of the signal applied thereto; a second network coupled in circuit with said rectifier system and having a time constant substantially shorter than said time constant of said impedance circuit for developing from said signal a second voltage substantially equal to said modification of said potential caused by said differences in said pulse durations; and means for combining said potential and said first and said second voltages to produce a resultant biasing potential for said amplifier in which the influence of said finite resistance of said device on said black level is substantially reduced.

6. A system for automatically controlling the black level of a signal in a signal-translating channel including alternating-current coupled amplifier stages which translate a television signal including video-frequency components and synchronizing-signal components having pulses of a predetermined polarity and of different durations and different periods and having a black level comprising: a video-frequency amplifier coupled to said channel for translating at least said video-frequency components and including a cathode-load output circuit for said translated components; a direct-current restorer system including a rectifier device having finite conduction resistance and an impedance circuit coupled to said channel and to said amplifier, said impedance circuit having a time constant substantially longer than the shortest one of said periods of said synchronizing-signal components and said device being so poled with respect to said predetermined polarity that said restorer system is effective to derive from said television signal a control potential for said amplifier which is representative of said black level undesirably modified due to said finite resistance of said device by variations in both the average amplitude of said signal and in the pulse durations of said synchronizing components; a first network coupled in circuit with said restorer system and including at least a portion of said cathode load circuit and having a time constant substantially shorter than said time constant of said impedance circuit for developing from said signal across said portion of said cathode circuit a first voltage substantially equal to said modification of said potential caused by variations in the average amplitude of the signal applied thereto; a second network including a second rectifier device conductive at the same time as said first rectifier device, coupled in circuit with said rectifier system and having a time constant substantially shorter than said time constant of said impedance circuit for developing from said signal a second voltage substantially equal to said modification of said potential caused by said differences in said pulse durations; and means for combining said potential and said first and said second voltages to produce a resultant biasing potential for said amplifier in which the influence of said finite resistance of said device on said black level is substantially reduced.

7. A system for automatically controlling the black level of a signal in a signal-translating channel which translates a television signal having video-frequency and synchronizing-signal components of a predetermined polarity and period and having a black level comprising: a video-frequency amplifier having a control electrode coupled to said channel for translating said video-frequency components and including a cathode-load output circuit for said translated components; a direct-current restorer system including a rectifier device having finite conduction resistance and an impedance circuit coupled to said channel and to said control electrode of said amplifier, said impedance circuit having a time constant substantially longer than said first period of said synchronizing-signal components and said device being so poled with respect to said predetermined polarity that said restorer system is effective to derive from said television signal a control potential for said amplifier which is representative of said black level undesirably modified by said finite resistance of said device; and a resistor-condenser network connected in series between said rectifier device and at least a portion of said cathode circuit and having a time constant substantially shorter than said time constant of said impedance circuit for developing from said signal across said portion of said load circuit a voltage substantially equal to said modification of said potential caused by said finite resistance of said device; whereby said voltage and said potential combine to produce a resultant potential in which the influence of said finite resistance of said device on said operating characteristic is reduced.

8. A system for automatically controlling the black level of a signal in a signal-translating channel including alternating-current coupled amplifier stages which translate a television signal including video-frequency components and synchronizing-signal components having pulses of a predetermined polarity and of distinctive durations and different periods and having a black level comprising: a video-frequency amplifier including a control electrode and cathode-load output circuit for said translated components; a direct-current restorer system including a rectifier device having finite conduction resistance and an impedance circuit coupled to said channel and to said control electrode of said amplifier, said impedance circuit having a time constant substantially longer than the shortest one of said periods of said synchronizing-signal components and said device being so poled with respect to said predetermined polarity that said restorer system is effective to derive from said television signal a control potential for said amplifier which is representative of said black level undesirably modified due to said finite resistance of said device by variations in both the average amplitude of said signal and in the pulse durations of said synchronizing components; a first resistor-condenser network connected in series between said rectifier device and said cathode circuit and having a time constant substantially shorter than said time constant of said impedance circuit for developing from said signal across said portion of said cathode circuit a first voltage substantially equal to said modification of said potential caused by variations in the average amplitude of said signal; a second network including another rectifier device coupled between said cathode circuit and said first rectifier device and having a time constant substantially shorter than said time constant of said impedance circuit for developing from said signal a second voltage substantially equal to said modification of said potential caused by said differences in said pulse durations; and means for combining said potential and said first and said second voltages to produce a resultant biasing potential for said stage in which the influence of said finite resistance of said device on said black level is substantially reduced.

References Cited in the file of this patent

UNITED STATES PATENTS

| Number | Name | Date |
|---|---|---|
| 2,227,056 | Blumlein et al. | Dec. 31, 1940 |
| 2,240,600 | Applegarth | May 6, 1941 |
| 2,302,425 | Deerhake | Nov. 17, 1942 |
| 2,515,763 | Downie | July 18, 1950 |
| 2,525,103 | Sprecher | Oct. 10, 1950 |

FOREIGN PATENTS

| Number | Country | Date |
|---|---|---|
| 474,266 | Great Britain | Oct. 28, 1937 |

OTHER REFERENCES

Journal of the Television Society, London, vol. 5, #12, December 1949, pages 339–348.